United States Patent
Mackenzie

(10) Patent No.: US 9,351,448 B2
(45) Date of Patent: May 31, 2016

(54) WALL PLANTING SYSTEM

(71) Applicant: Hortech, Inc., Nunica, MI (US)

(72) Inventor: David S. Mackenzie, Nunica, MI (US)

(73) Assignee: Hortech, Inc., Nunica, MI (US)

( * ) Notice: Subject to any disclaimer, the term of this patent is extended or adjusted under 35 U.S.C. 154(b) by 388 days.

(21) Appl. No.: 13/626,390

(22) Filed: Sep. 25, 2012

(65) Prior Publication Data

US 2014/0083004 A1    Mar. 27, 2014

(51) Int. Cl.
*A01G 9/02* (2006.01)

(52) U.S. Cl.
CPC .............. *A01G 9/025* (2013.01); *Y02P 60/244* (2015.11)

(58) Field of Classification Search
CPC .......... A01G 9/02; A01G 27/00; A01G 9/025
USPC ................ 47/82, 83, 85, 86, 87, 46, 47, 66.6, 47/66.5, 65.5, 65.9, 66.1
See application file for complete search history.

(56) References Cited

U.S. PATENT DOCUMENTS

| | | | |
|---|---|---|---|
| 2,279,735 A | | 4/1942 | Gates |
| 2,513,711 A | | 7/1950 | Cain |
| 2,514,536 A | | 7/1950 | Burney |
| 3,033,378 A | * | 5/1962 | Dethardt et al. ......... 211/126.13 |
| 4,123,873 A | | 11/1978 | Canova |
| 4,161,085 A | | 7/1979 | Moffett, Jr. |
| 4,228,906 A | * | 10/1980 | Jones .......................... 211/88.01 |
| 4,255,896 A | | 3/1981 | Carl |
| 4,295,296 A | * | 10/1981 | Kinghorn .......................... 47/82 |
| 4,334,386 A | | 6/1982 | Burcombe et al. |
| 4,347,687 A | | 9/1982 | Sibbel |
| 4,593,490 A | | 6/1986 | Bodine |
| 4,896,456 A | * | 1/1990 | Grant ................................. 47/67 |
| 4,920,695 A | | 5/1990 | Garden |
| 5,095,649 A | | 3/1992 | Brownlee |
| 5,265,376 A | | 11/1993 | Less |

(Continued)

FOREIGN PATENT DOCUMENTS

| EP | 2335473 | 6/2011 |
|---|---|---|
| FR | 2857396 | 7/2003 |

(Continued)

OTHER PUBLICATIONS

International Search Report, Aug. 17, 2011, Korean Intellectual Property Office.

(Continued)

*Primary Examiner* — Kristen C. Hayes
*Assistant Examiner* — Ebony Evans
(74) *Attorney, Agent, or Firm* — Price Heneveld LLP

(57) ABSTRACT

A wall mounted agricultural system that includes a mounting structure including a first end and a second end and supported from a substantially vertically extending wall surface, and at least one planter box that includes a plurality of sidewalls and a bottom wall that cooperate to form a compartment adapted to receive plant matter therein and an upwardly opening aperture adapted to receive a fluid therethrough, wherein at least one of the side walls comprises a rear wall facing the wall surface, the at least one planter box is adapted to mount to the mounting structure such that the rear wall is spaced from the wall surface to create a space therebetween, and wherein the at least one planter box includes an aperture in fluid communication with the compartment and the space positioned between the rear wall and the wall surface.

16 Claims, 5 Drawing Sheets

(56) References Cited

U.S. PATENT DOCUMENTS

| | | |
|---|---|---|
| 5,373,662 A | 12/1994 | Wickstrom |
| 5,647,695 A | 7/1997 | Hilfiker et al. |
| 5,669,185 A | 9/1997 | Proulx |
| 5,950,974 A * | 9/1999 | Hoffmann ................ 248/223.41 |
| 6,408,570 B1 | 6/2002 | Shih et al. |
| 6,615,542 B2 | 9/2003 | Ware |
| 7,171,782 B2 | 2/2007 | Felknor et al. |
| 7,536,829 B2 | 5/2009 | Genma et al. |
| 7,627,983 B1 | 12/2009 | Deutsch-Aboulmahassine |
| 8,646,205 B2 * | 2/2014 | Cho ................ A01G 9/025 47/66.6 |
| 2008/0003445 A1 | 1/2008 | Okuda et al. |
| 2008/0110086 A1 | 5/2008 | Julia |
| 2009/0260282 A1 | 10/2009 | Hashimoto et al. |
| 2009/0300984 A1 | 12/2009 | Gordon |
| 2010/0037517 A1 | 2/2010 | Copping et al. |
| 2010/0095586 A1 | 4/2010 | Sichello |
| 2011/0016784 A1 | 1/2011 | Taber |
| 2011/0113685 A1 | 5/2011 | Chang |
| 2011/0192081 A1 * | 8/2011 | MacKenzie .................... 47/66.6 |
| 2011/0192084 A1 | 8/2011 | MacKenzie |
| 2012/0186148 A1 | 7/2012 | Chang |
| 2013/0118070 A1 * | 5/2013 | Marquez ..................... 47/66.6 |

FOREIGN PATENT DOCUMENTS

| | | |
|---|---|---|
| GB | 2222063 | 2/1990 |
| GB | 2475101 | 5/2011 |
| JP | 2004248533 | 9/2004 |
| JP | 2005160381 | 6/2005 |
| JP | 2008029322 | 2/2008 |
| JP | 2011083200 | 4/2011 |

OTHER PUBLICATIONS

European Search Report, Jan. 9, 2014.

* cited by examiner

WALL PLANTING SYSTEM

BACKGROUND OF THE INVENTION

The present invention relates to a planting system, and in particular to a modular wall planting system that is adapted to secure to a vertical surface of a wall or a building structure.

SUMMARY OF THE INVENTION

One aspect of the present invention is to provide a modular wall mounted agricultural system comprising a mounting structure comprising a first member including a first end and a second end, wherein the mounting structure is supported from a substantially vertically extending wall surface, and at least one planter box that includes a plurality of sidewalls and a bottom wall that cooperate to form a compartment adapted to receive plant matter therein and an upwardly opening aperture adapted to receive a fluid therethrough, wherein at least one of the sidewalls comprises a rear wall facing the wall surface, the at least one planter box is adapted to mount to the mounting structure such that the rear wall is spaced from the wall surface to create a space therebetween, and wherein the at least one planter box includes an aperture in fluid communication with the compartment and the space positioned between the rear wall and the wall surface.

Another aspect of the present invention is to provide a modular wall mounting agricultural system comprising a mounting structure comprising a first member including a first end and a second end, wherein the mounting structure is adapted to be supported from a substantially vertically extending wall surface, and an upwardly opening first channel and a downwardly opening second channel each extending between the first and second ends. The system further comprising a pair of planter boxes each including a front wall, a pair of side walls, a rear wall and a bottom wall that cooperate to form a compartment adapted to receive plant matter therein and an upwardly opening aperture adapted to receive fluid therethrough, wherein the rear wall is adapted to face the wall surface creating a space therebetween, each planter box includes an aperture in fluid communication with the compartment and the space positioned between the rear wall and the wall surface, the pair of planter boxes includes a first planter box having a substantially planar portion adapted to removably engage the first channel and a second planter box having a substantially planar portion adapted to removably engage the second channels such that the first and second planter boxes are at least partially vertically aligned with one another and the spaces between the rear wall of each of the planter boxes and the wall surface are in fluid communication with one another.

These and other features, advantages, and objects of the present invention will be further understood and appreciated by those skilled in the art by reference to the following specification, claims, and appended drawings.

DETAILED DESCRIPTION

Figure 1:
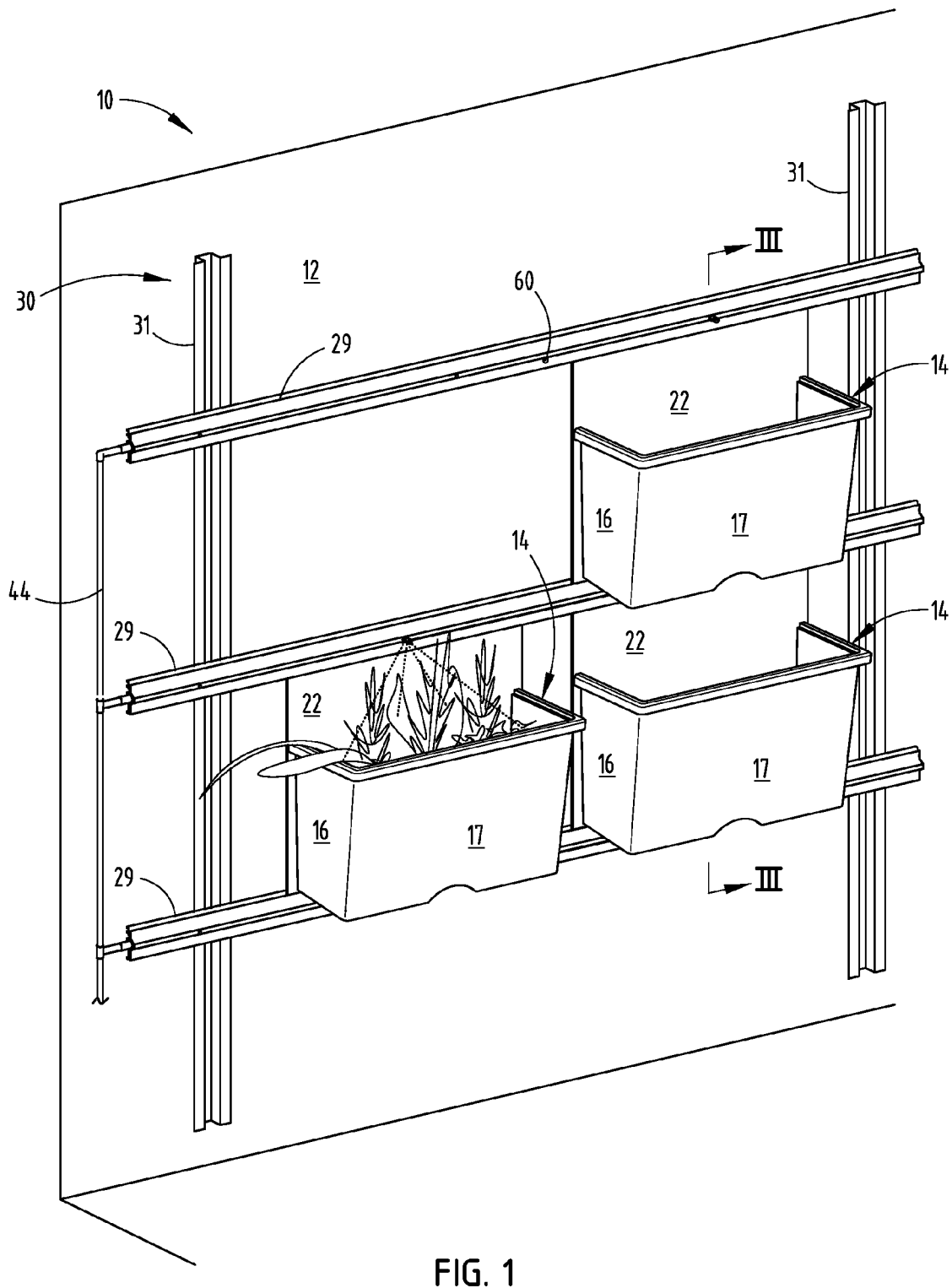
FIG. 1 is a perspective view of a vertical surface employing the modular wall mounted agricultural system embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a modular wall mounted agricultural system embodying the present invention. In the illustrated example, the modular wall mounted agricultural system 10 is employed on, and secured to, a vertical wall surface 12 of a building structure, although the wall mounted agricultural system 10 may be utilized in conjunction with both interior and exterior vertical and substantially vertical wall surfaces. The wall mounted agricultural system 10 comprises at least one planter box 14, but more likely a plurality of planter boxes 14, which cooperate to completely cover the vertical wall surface 12.

Figure 2:
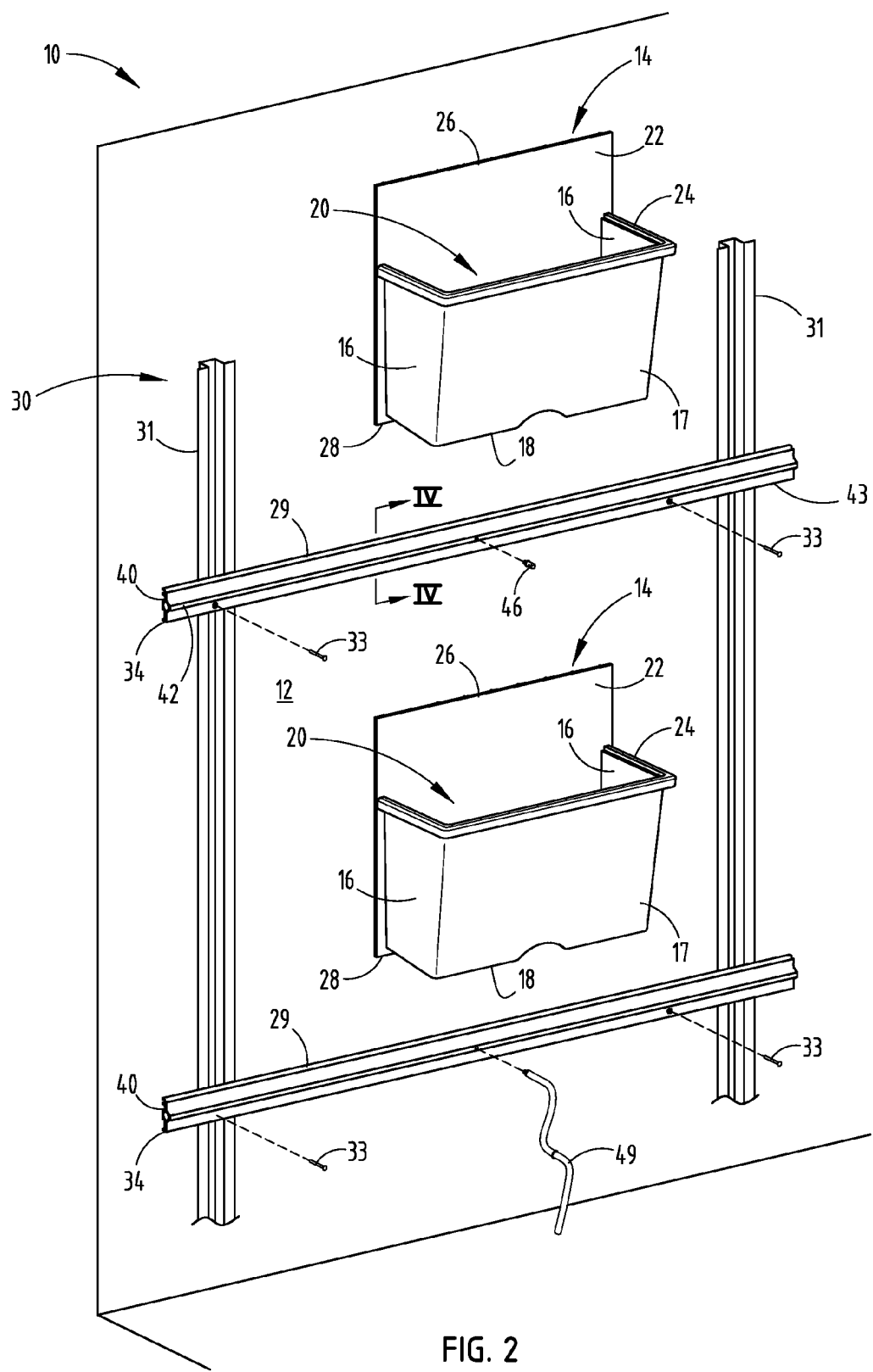
FIG. 2 is an exploded perspective view of the modular wall mounted agricultural system.
Figure 3:
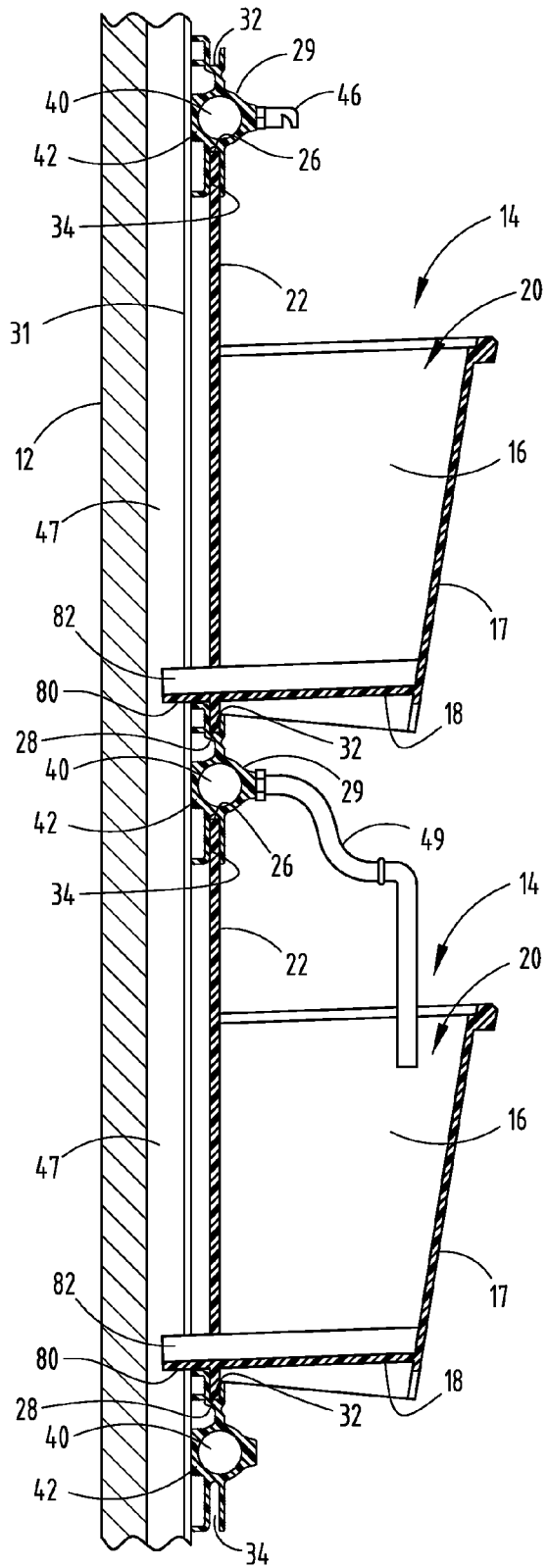
FIG. 3 is a cross-sectional side view of the modular wall mounted agricultural system, taken along the line III-III, FIG. 1.
Figure 4:
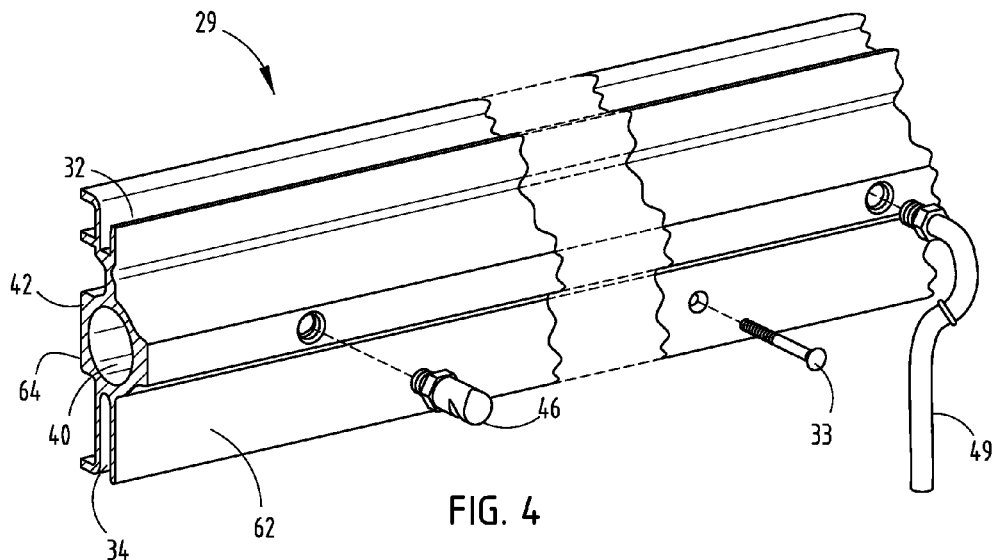
FIG. 4 is an exploded perspective view of a mounting member of the modular wall mounted agricultural system.
Figure 5:
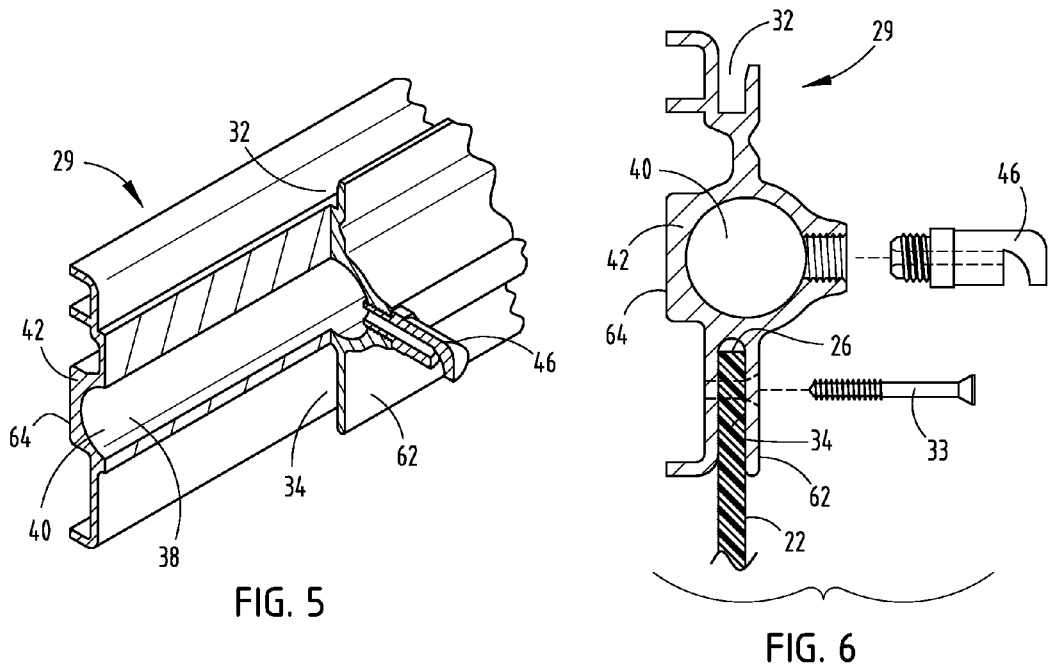
FIG. 5 is a cross-sectional perspective view of the mounting member.
Figure 6:
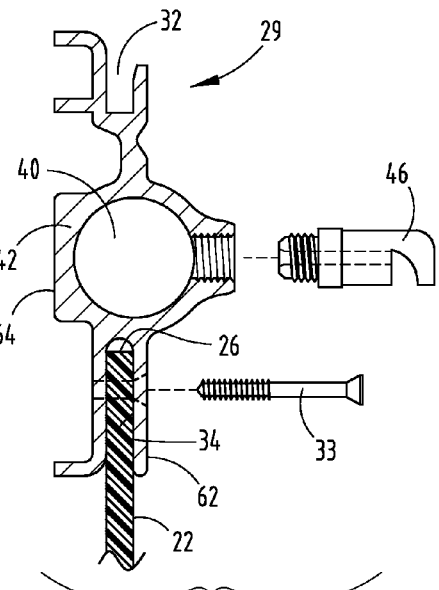
FIG. 6 is a cross-sectional side view of the mounting member.

As best illustrated in FIGS. 2 and 3, each planter box 14 includes a plurality of sidewalls including a pair of sidewalls 16, a front wall 17, and a rear wall 22, and include a bottom wall 18 that cooperate to form an interior compartment 20. The interior compartment 20 is configured to receive plant matter therein, such as plantings and aggregate, e.g., dirt, soil, sand, and the like.

Each planter box 14 includes a rear wall 22 that facilitates enclosing the interior compartment 20 and extends upwardly to a point above a top edge 24 of each sidewall 16 and also extends in a substantially downward direction to a point below the bottom wall 18. The wall mounted agricultural system 10 includes a mounting structure 30 that includes a plurality of horizontally extending mounting members 29 and a plurality of vertically extending frame members 31 that are adapted to support the planter boxes 14 from the wall surface 12. Each mounting member 29 is formed to have a substantially H-shaped cross-section along the entire length of the mounting structure 30. The H-shape of each mounting member 29 forms an upper channel 32 and a lower channel 34 that each extend along the longitudinal direction of the mounting member 29. The upper channel 32 is sized to receive a lower edge 28 of the rear wall 22 of the planter box 14. The lower channel 34 is sized to receive a top edge 26 of the rear wall 22 of the planter box 14. Therefore, two mounting members 29 are typically employed to secure each planter box 14. Each vertical frame member 31 is provided a hat-shaped cross-sectional configuration. A plurality of mechanical fasteners such as screws 33 extend through the mounting members 29 and frame member 31 to secure each to the wall surface 12.

As seen in FIGS. 2-6, each mounting member 29 includes a first end 42, a second end 43, and a conduit 38 that extends along the longitudinal direction of the mounting member 29.

In the illustrated example, an input aperture 40 is located at the first end 42 of the mounting member 29. Additionally, an output aperture may be included at the second end 43. The input aperture 40 is sized and adapted so as to telescopingly mate with an input water line 44. Tapped into the conduit 38 is a water spraying device, such as a nozzle 46. The nozzle 46 is adapted to spray or mist water from the waterway 38 onto the plant matter residing in the planter box 14 immediately below the mounting member 29.

Alternatively, the nozzles 46 are replaced with drip assemblies 49 (FIGS. 3 and 4) tapped into the conduit 38 and extending into the plant matter located within the interior compartment 20. While nozzles 46 and drip assemblies 49 are described herein, other devices suitable for delivering fluid from the conduit 38 to the interior compartment may also be utilized.

In assembly, the plurality of mounting members 29 and the vertical frame members 31 are secured to the wall surface 12 via the plurality of screws 29 such that the rear wall 22 of each planter 14 is spaced from the wall surface 22 defining a space 47 therebetween. It is noted that the space 47 is concealed from view to an observer positioned in front of the system 10. The mounting members 29 are secured to the wall surface 12 in a vertically aligned manner and sufficiently spaced to accommodate planter boxes 14 therebetween. As described previously, the top edge 26 of each planter box 14 securely engages into the bottom channel 34 of a mounting member 29 and the bottom edge 28 of the planter box 14 rearwall 22 securely engages the top channel 32 of a mounting member 29. The input water line 44 brings water from a source and is passed through the input aperture 40 of each mounting member 29. This allows water to be distributed to the plant matter within the planter boxes 14 as needed, via the nozzle 46.

Figure 7:
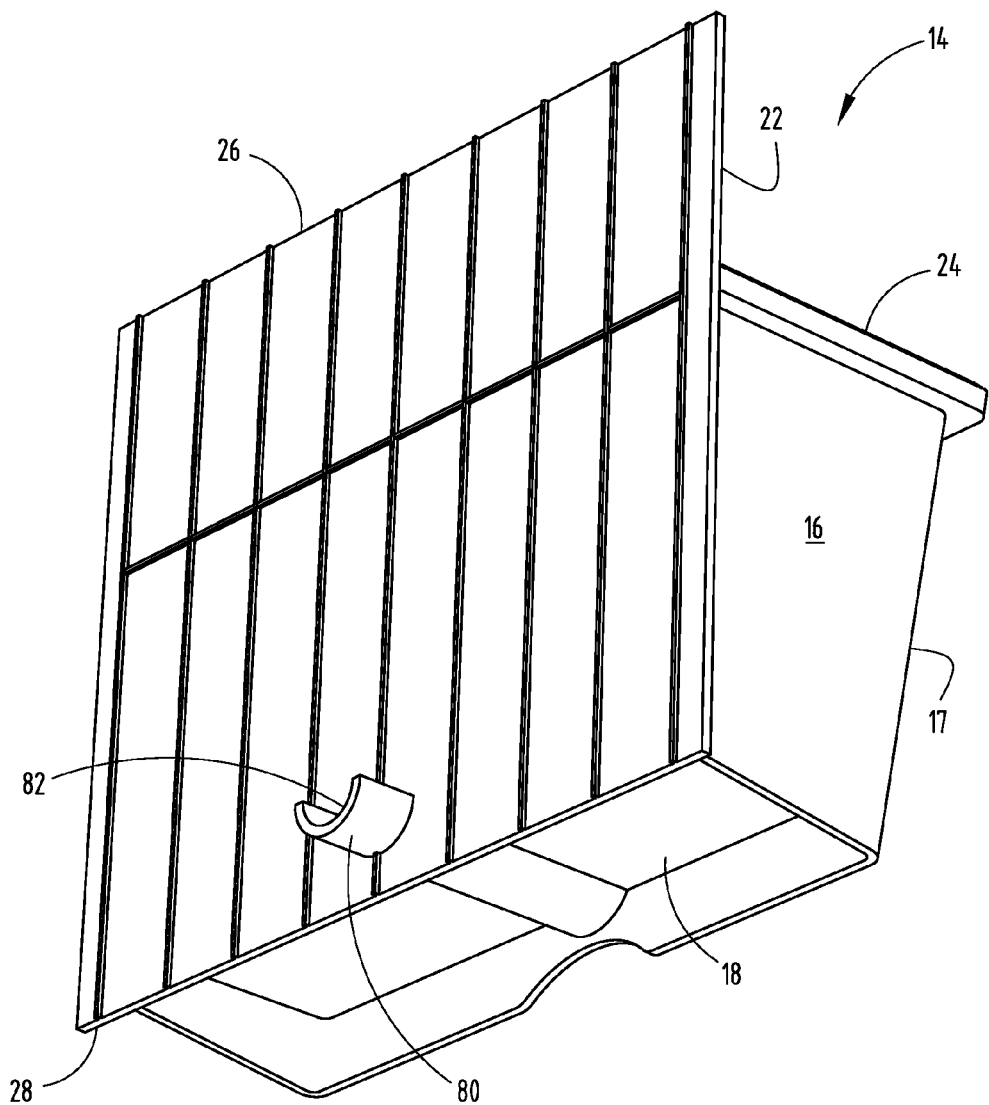
FIG. 7 is a rear perspective view of a planter box.

As best illustrated in FIGS. 3 and 7, each planter box 14 further includes an integral trough 80 located within the bottom wall 18 and extending through the rear wall 22 defining an aperture 82 therethrough that provides fluid communication between the interior compartment 20 and the space 47 defined between the rear wall 22 and the wall surface 12. In the illustrated example, the trough 80 includes a semi-circular cross-sectional configuration.

In operation, fluid received within the compartment 20 of the planter box 14 exits the compartment 20 via the trough 80 and aperture 82. This fluid drains into the space 47. The rear walls 22 of vertically aligned planter boxes 14 cooperate to conceal adjacent spaces 47, such that the fluid may travel vertically behind the plurality of planter boxes 47 without being seen.

The present inventive modular wall mounted agricultural system allows plant matter to be secured to vertical and substantially vertical surfaces of wall structures of free standing walls and buildings, thereby increasing the aesthetic appearance of the structure as well as improving the thermal efficiency of associated buildings. Further, the wall mounted agricultural system provides a durable outer surface to the structure to which it is attached, and includes a relatively uncomplicated design that may be installed and maintained by relatively unskilled personal. The present inventive planting system is efficient to use, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A modular wall mounted agricultural system, comprising:
    a mounting structure comprising a first member including a first end and a second end, wherein the mounting structure is supported from a substantially vertically extending wall surface; and
    at least one planter box that includes a plurality of sidewalls and a bottom wall that cooperate to form a compartment adapted to receive plant matter therein and an upwardly opening aperture adapted to receive a fluid therethrough, wherein at least one of the sidewalls comprises a rear wall facing the wall surface, the at least one planter box is configured to mount to the mounting structure such that the rear wall is spaced from the wall surface to create a space therebetween, and wherein the at least one planter box includes a drain aperture in fluid communication with the compartment and the space positioned between the rear wall and the wall surface, and wherein the drain aperture in fluid communication with the space is configured to allow water to drain from the planter box into the space;
    wherein the first member of the mounting structure extends includes at least one longitudinally extending channel, and wherein the at least one planter box is supported within the at least one channel;
    wherein the at least one planter box includes an outwardly extending substantially planar portion adapted to removably engage the at least one channel; and
    wherein the at least one planter box includes a fluid conduit providing fluid communication between the drain aperture and the space.

2. A modular wall mounted agricultural system, comprising:
    a mounting structure comprising a first member including a first end and a second end, wherein the mounting structure is supported from a substantially vertically extending wall surface; and
    at least one planter box that includes a plurality of sidewalls and a bottom wall that cooperate to form a compartment adapted to receive plant matter therein and an upwardly opening aperture adapted to receive a fluid therethrough, wherein at least one of the sidewalls comprises a rear wall facing the wall surface, the at least one planter box is configured to mount to the mounting structure such that the rear wall is spaced from the wall surface to create a space therebetween, and wherein the at least one planter box includes an aperture in fluid communication with the compartment and the space positioned between the rear wall and the wall surface, wherein the aperture in fluid communication with the space is configured to allow water to drain from the planter box into the space, and wherein a fluid conduit is integral with the rear wall of the planter box.

3. The modular wall mounted agricultural system of claim 2, wherein the conduit comprises a semi-circular, cross-sectional configuration.

4. The modular wall mounted agricultural system of claim 2, wherein the mounting structure further comprises a second member positioned between the first member and the wall surface, wherein the second member is attached to the wall surface and the first member is attached to the second member, thereby supporting the first mounting structure from the wall surface.

5. The modular wall mounted agricultural system of claim 4, wherein the first member extends substantially horizontally with respect to the wall surface, and wherein the second member extends substantially vertically with respect to the wall surface.

6. The modular wall mounted agricultural system of claim 1, wherein the at least one planted box includes a plurality of vertically aligned planter boxes, and wherein the spaces located between the rear wall of planter boxes and the wall surface are in fluid communication with one another.

7. A modular wall mounted agricultural system, comprising:
   a mounting structure comprising a first member including a first end and a second end, wherein the mounting structure is supported from a substantially vertically extending wall surface; and
   at least one planter box that includes a plurality of sidewalls and a bottom wall that cooperate to form a compartment adapted to receive plant matter therein and an upwardly opening aperture adapted to receive a fluid therethrough, wherein at least one of the sidewalls comprises a rear wall facing the wall surface, the at least one planter box is configured to mount to the mounting structure such that the rear wall is spaced from the wall surface to create a space therebetween, and wherein the at least one planter box includes a drain aperture in fluid communication with the compartment and the space positioned between the rear wall and the wall surface, and wherein the drain aperture in fluid communication with the space is configured to allow water to drain from the planter box into the space;
   wherein the first member of the mounting structure extends includes at least one longitudinally extending channel, and wherein the at least one planter box is supported within the at least one channel;
   wherein the at least one planter box includes an outwardly extending substantially planar portion adapted to removably engage the at least one channel; and
   wherein the first member of the mounting structure comprises a fluid conduit extending longitudinally between the first and the second end, and wherein the at least one planter box receives fluid through the upwardly opening aperture via the fluid conduit.

8. A modular wall mounted agricultural system, comprising:
   a mounting structure comprising a first member including a first end and a second end, wherein the mounting structure is supported from a substantially vertically extending wall surface; and
   at least one planter box that includes a plurality of sidewalls and a bottom wall that cooperate to form a compartment adapted to receive plant matter therein and an upwardly opening aperture adapted to receive a fluid therethrough, wherein at least one of the sidewalls comprises a rear wall facing the wall surface, the at least one planter box is configured to mount to the mounting structure such that the rear wall is spaced from the wall surface to create a space therebetween, and wherein the at least one planter box includes a drain aperture in fluid communication with the compartment and the space positioned between the rear wall and the wall surface, and wherein the aperture in fluid communication with the space is configured to allow water to drain from the planter box into the space;
   wherein the first member of the mounting structure extends includes at least one longitudinally extending channel, and wherein the at least one planter box is supported within the at least one channel;
   wherein the mounting structure further comprises a second member positioned between the first member and the wall surface, wherein the second member is attached to the wall surface and the first member is attached to the second member, thereby supporting the first mounting structure from the wall surface; and
   wherein the second member comprises a substantially hat-shaped cross-section configuration.

9. A modular wall mounted agricultural system, comprising:
   a mounting structure comprising a first member including a first end and a second end, wherein the mounting structure is supported from a substantially vertically extending wall surface; and
   at least one planter box that includes a plurality of sidewalls and a bottom wall that cooperate to form a compartment adapted to receive plant matter therein and an upwardly opening aperture adapted to receive a fluid therethrough, wherein at least one of the sidewalls comprises a rear wall facing the wall surface, the at least one planter box is configured to mount to the mounting structure such that the rear wall is spaced from the wall surface to create a space therebetween, and wherein the at least one planter box includes an aperture in fluid communication with the compartment and the space positioned between the rear wall and the wall surface, and wherein the aperture in fluid communication with the space is configured to allow water to drain from the planter box into the space;
   wherein the first member of the mounting structure extends includes at least one longitudinally extending channel, and wherein the at least one planter box is supported within the at least one channel; and
   wherein the at least one channel includes an upwardly opening first channel and a downwardly opening second channel, the at least one planter box includes a first planter box mounted within the first channel and a second planter box mounted within the second channel.

10. The modular wall mounted agricultural system of claim 9, wherein the first member of the mounting structure has a substantially H-shaped cross-sectional configuration.

11. A modular wall mounted agricultural system, comprising:
    a mounting structure comprising a first member including a first end and a second end, wherein the mounting structure is supported from a substantially vertically extending wall surface; and
    at least one planter box that includes a plurality of sidewalls and a bottom wall that cooperate to form a compartment adapted to receive plant matter therein and an upwardly opening aperture adapted to receive a fluid therethrough, wherein at least one of the sidewalls comprises a rear wall facing the wall surface, the at least one planter box is configured to mount to the mounting structure such that the rear wall is spaced from the wall surface to create a space therebetween, and wherein the at least one planter box includes a drain aperture in fluid communication with the compartment and the space positioned between the rear wall and the wall surface, and wherein the drain aperture in fluid communication with the space is configured to allow water to drain from the planter box into the space;
    wherein the first member of the mounting structure extends includes at least one longitudinally extending channel, and wherein the at least one planter box is supported within the at least one channel;

wherein the at least one planter box includes an outwardly extending substantially planar portion adapted to removably engage the at least one channel;

wherein the first member of the mounting structure comprises a fluid conduit extending longitudinally between the first and the second end, the mounting structure further comprises at least a select one of a nozzle and a drip assembly in fluid communication with the conduit and adapted to provide water to plant matter located within the at least one planter box.

12. A modular wall mounted agricultural system, comprising:

a mounting structure comprising a first member including a first end and a second end, wherein the mounting structure is adapted to be supported from a substantially vertically extending wall surface, and an upwardly opening first channel and a downwardly opening second channel each extending between the first end and the second end; and a pair of planter boxes each including a front wall, a pair of sidewalls, a rear wall and a bottom wall that cooperate to form a compartment adapted to receive plant matter therein and an upwardly opening aperture adapted to receive a fluid therethrough, wherein the rear wall is adapted to face the wall surface creating a space therebetween, each planter box includes an aperture in fluid communication with the compartment and the space positioned between the rear wall and the wall surface, the aperture in fluid communication with the space is configured to allow water to drain from the planter box into the space, the pair of planter boxes including a first planter box having a substantially planar portion adapted to removably engage the first channel and a second planter box having a substantially planar portion adapted to removably engage the second channel such that the first and second planter boxes are at least partially vertically aligned with one another and the spaces between the rear wall of the each of the planter boxes and the wall surface are in fluid communication with one another.

13. The modular wall mounted agricultural system of claim 12, wherein the spaces are concealed from view from an observer position in front of the modular wall mounted agricultural system.

14. The modular wall mounted agricultural system of claim 12, wherein the at least one planter box includes a fluid conduit providing fluid communication between the aperture and the space.

15. The modular wall mounted agricultural system of claim 14, wherein the fluid conduit is integral with the rear wall of the planter box.

16. The modular wall mounted agricultural system of claim 15, wherein the conduit comprises a semi-circular, cross-sectional configuration.

* * * * *